(12) United States Patent
Morris et al.

(10) Patent No.: US 6,402,179 B1
(45) Date of Patent: Jun. 11, 2002

(54) LIGHTWEIGHT TOWING CROSS MEMBER FOR A VEHICLE

(75) Inventors: Austin Morris, Orchard Lake; Chris Sean Young, Plymouth; Henry J. Cornille, Farmington Hills; Michael William Danyo, Trenton, all of MI (US)

(73) Assignee: Ford Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/681,620

(22) Filed: May 10, 2001

(51) Int. Cl.[7] .............................................. B60D 13/00
(52) U.S. Cl. ...................................... 280/495; 280/500
(58) Field of Search ................................ 280/495, 500, 280/504, 505; D12/162

(56) References Cited

U.S. PATENT DOCUMENTS

| 3,843,165 A | * | 10/1974 | Mathisen ..................... 280/495 |
| 4,893,856 A | | 1/1990 | Council |
| 5,277,448 A | * | 1/1994 | Colibert ..................... 280/495 |
| 5,507,515 A | | 4/1996 | Schellenberg et al. |
| 5,511,813 A | * | 4/1996 | Kravitz ..................... 280/495 |
| 5,609,004 A | | 3/1997 | Kreis |
| 5,628,536 A | | 5/1997 | Fulkerson |
| 5,845,948 A | | 12/1998 | Anderson et al. |
| 6,095,546 A | | 8/2000 | Austin |
| 6,173,984 B1 | * | 1/2001 | Kay ........................... 280/495 |
| 6,234,512 B1 | * | 5/2001 | Bettenhausen .............. 280/495 |

* cited by examiner

Primary Examiner—Daniel G. DePumpo
(74) Attorney, Agent, or Firm—Ford Global tech.

(57) ABSTRACT

A lightweight towing cross member assembly 10 is disclosed. The cross member assembly 10 includes relatively lightweight front and rear cross members 12, 14, and reinforcement plates 16, 18 which offer added support to the assembly 10. The heavy-gauge, load-bearing plates 16, 18 are localized in the areas of high stress (i.e., the center of the assembly 10), and provide the assembly 10 with the load-bearing ability and towing performance of prior towing cross member assemblies, which are manufactured solely from heavy-gauge materials.

14 Claims, 3 Drawing Sheets

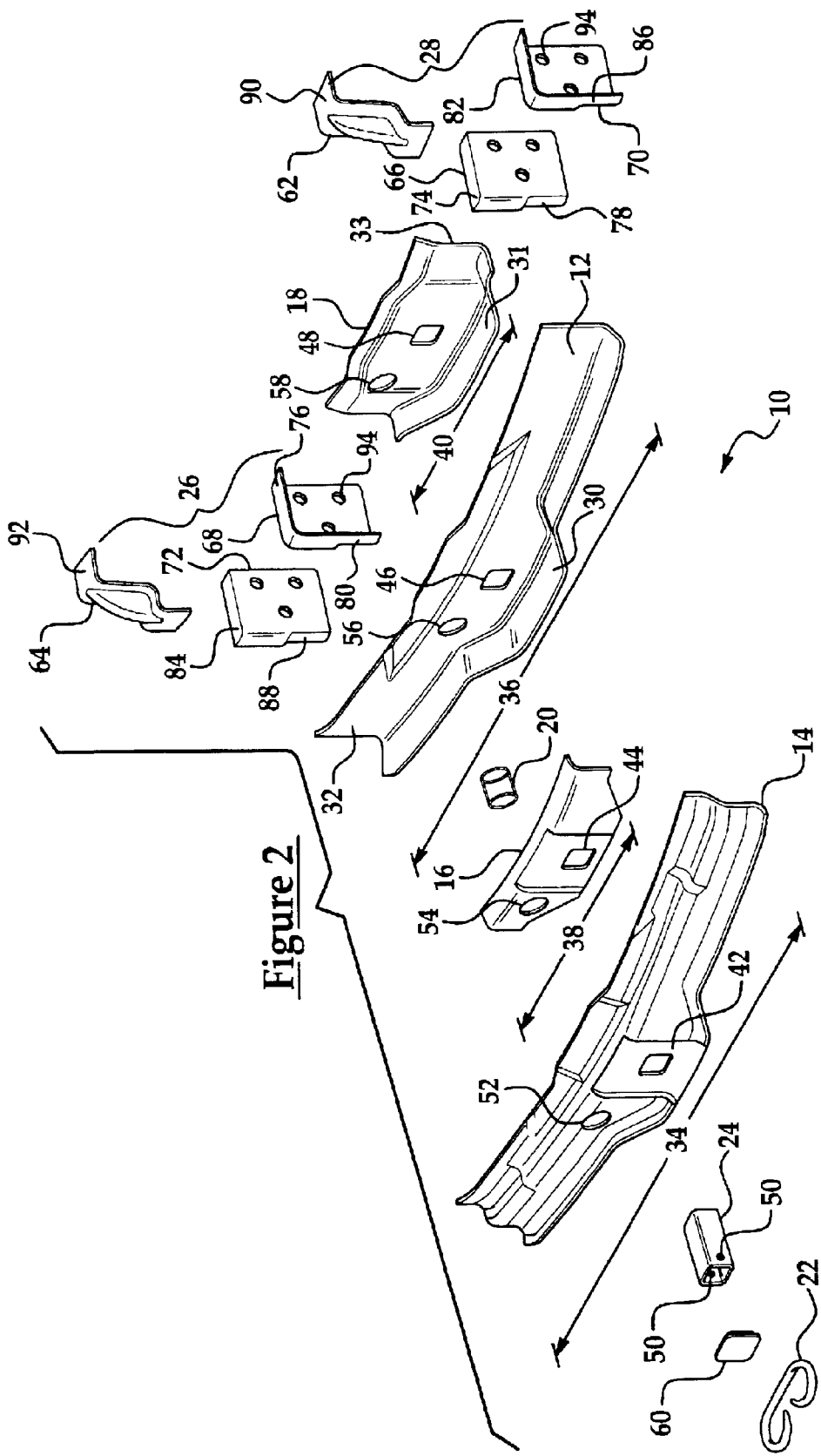

LIGHTWEIGHT TOWING CROSS MEMBER FOR A VEHICLE

CROSS REFERENCE TO RELATED APPLICATIONS

The U.S. Government has a paid-up license in this invention and the right in limited circumstances to require the patent owner to license others on reasonable terms as provided for by the terms of the Contract Number AC 05-960R22464 awarded by the Partnership for the Next Generation of Vehicle (PNGV).

BACKGROUND OF INVENTION

The present invention relates to a lightweight towing cross member for a vehicle and more particularly, to a towing cross member which is adapted for use in combination with a vehicle and which has a reduced weight relative to prior towing cross members, while maintaining the performance and load-bearing attributes of prior cross members.

Some vehicles such as trucks, commercial vehicles, sports utility vehicles, and pick-ups often include towing cross members which are coupled to the vehicle platform, towed. These cross members are generally made entirely of a relatively "heavy" metal material, such as a heavy-gauge steel and are designed to withstand loads imparted by trailers which exceed 18,000 pounds.

Due to the material used to construct these prior cross members (e.g., heavy-gauge steel), the cross members are relatively heavy, and have an associated "weight penalty" which can adversely effect certain vehicle attributes. For example and without limitation, the relatively heavyweight of the cross members adversely effects the vehicle fuel economy and increases the consumption of natural resources. Furthermore, the relatively heavy weight of prior cross members and all of their sub-components causes the assembly procedures for the cross members and vehicles to be relatively difficult and laborious, thereby increasing production time and labor costs.

There is therefore a need for a towing cross member which is lighter than previous cross members, which has a high load-bearing capability, which is made primarily out of a relatively lightweight metal, such as aluminum, and which utilizes a relatively heavy gauge metal only in local areas of high stress.

SUMMARY OF INVENTION

A first non-limiting advantage of the present invention is that it provides a towing cross member which is substantially lighter relative to prior cross members.

A second non-limiting advantage of the present invention is that it utilizes a relatively lightweight material to form a majority of the towing cross member and utilizes relatively heavy gauge material only in certain localized areas of high stress.

A third non-limiting advantage of the present invention is that it simplifies and reduces the cost of prior assembly procedures, by providing relatively lightweight components which are easier to manipulate and assemble.

According to a first aspect of the present invention, a towing cross member is provided for use with a vehicle. The towing cross member includes a first cross member; a first reinforcement plate which conforms with and is coupled to a center portion of the first cross member; a second cross member which is coupled to the first cross member; a second reinforcement plate which conforms with and is coupled to a center portion of the second cross member; a receiver tube which is fixedly disposed within the center of the towing cross member and which is adapted to receive a trailer hitch; and a pair of bracket assemblies which are coupled to the first and second cross members and which are adapted to allow the towing cross member to be mounted to a portion of the vehicle.

According to a second aspect of the present invention, a method for manufacturing a towing cross member is provided. The method includes the steps of: providing first and second generally elongated cross members which are formed from a relatively lightweight material; determining areas on the first and second generally elongated cross members that would experience high stress during towing operation; providing first and second reinforcement plates which are respectively shaped to conform with the areas of high stress; coupling the first reinforcement plate to the first generally elongated cross member, effective to reinforce the areas of high stress on the first generally elongated cross member; coupling the second reinforcement plate to the second generally elongated cross member, effective to reinforce the areas of high stress on the second generally elongated cross member; and coupling the first generally elongated cross member to the second generally elongated cross member.

These and other objects, aspects, features, and advantages of the present invention will become apparent from a consideration of the following specification and the attached drawings.

BRIEF DESCRIPTION OF DRAWINGS

FIG. 2 is an exploded view of the towing cross member shown in FIG. 1.

DETAILED DESCRIPTION

Figure 1:
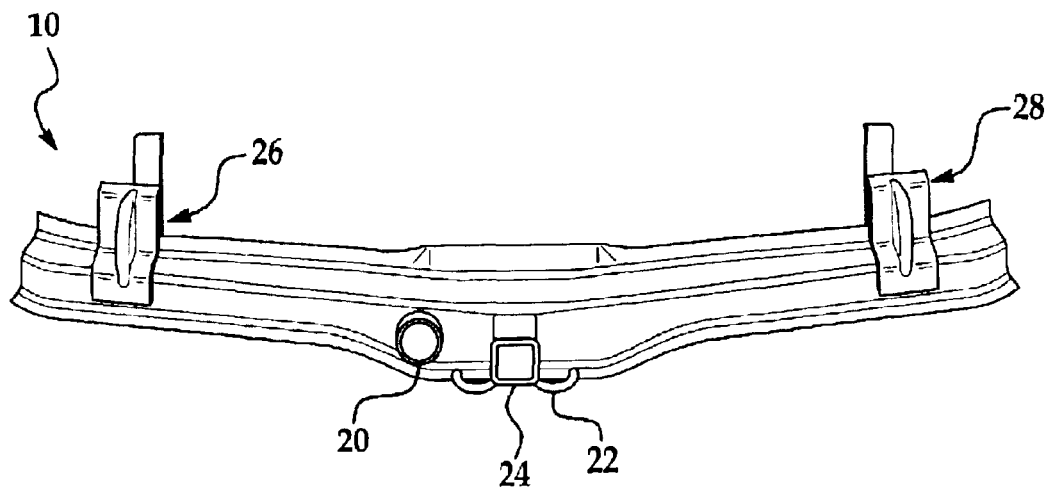
FIG. 1 is a front view of a lightweight towing cross member which is made in accordance with the teachings of the preferred embodiment of the present invention.
Figure 3A:
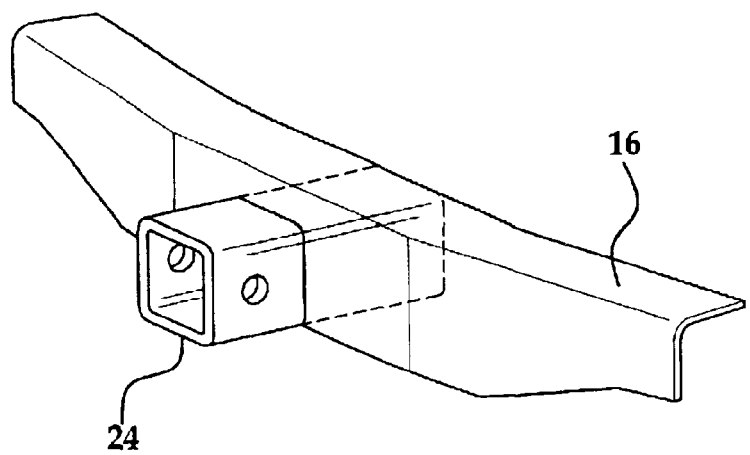
FIGS. 3A–3E illustrate one non-limiting example of an assembly sequence used to manufacture the towing cross member shown in FIG. 1.
Figure 3B:
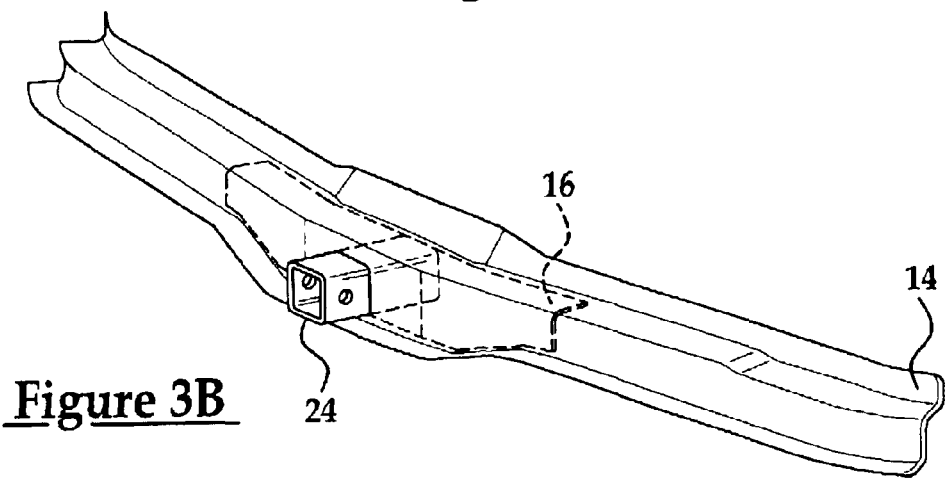
Figure 3C:
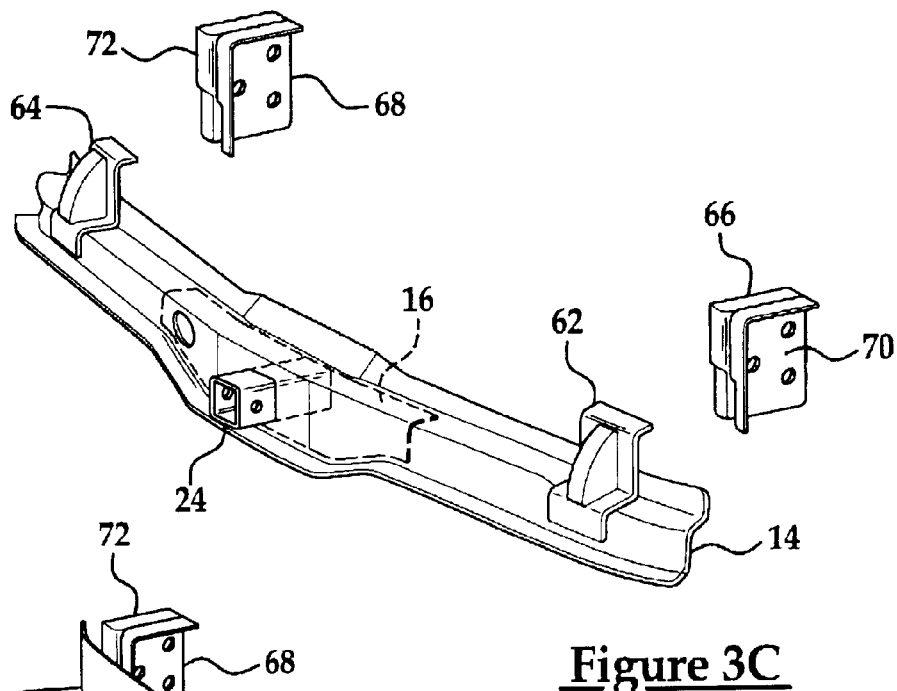
Figure 3D:
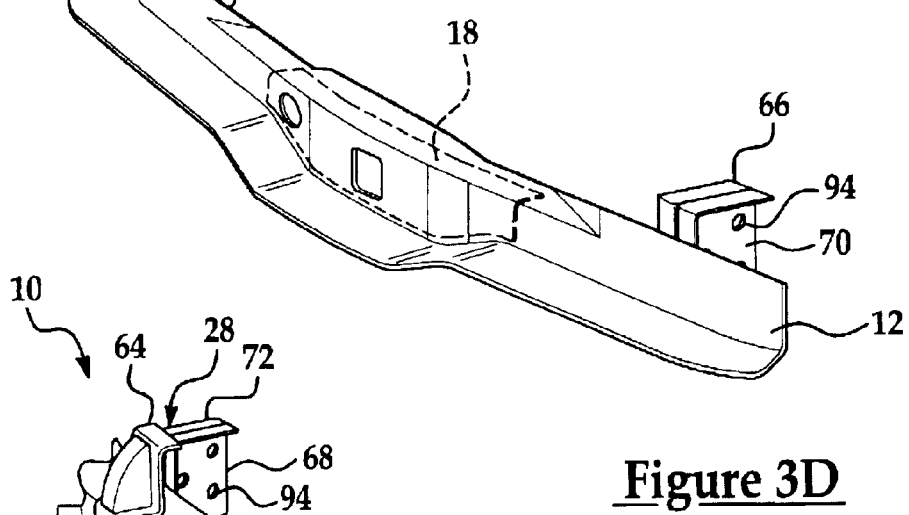
Figure 3E:
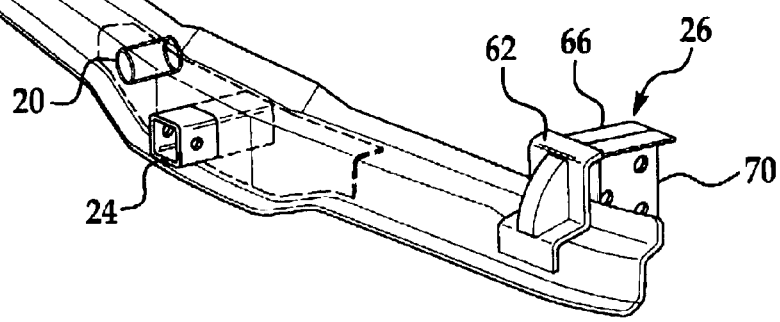

Referring now to FIGS. 1–2, there is shown a towing cross member, apparatus or assembly 10 which is made in accordance with the teachings of the preferred embodiment of the invention. Assembly 10 is adapted to be operatively mounted to a vehicle frame, body or underbody in a conventional manner (e.g., by use of bolt-type fasteners).

As best shown in FIG. 2, cross member 10 includes a "rear side" cross member stamping 12, a "front side" cross member stamping 14, a pair of reinforcement plates 16, 18, an electrical pass through tube 20, towing hooks 22, a receiver tube 24 and bracket assemblies 26, 28.

In the preferred embodiment of the invention, cross members 12, 14 are each generally elongated and are slightly curved along their respective lengths 34, 36 in order to conform to the shape of the vehicle's bumper fascia (not shown). The cross members 12, 14 are longitudinally coextensive with the bumper fascia, which is coupled to the cross members 12, 14 in a conventional manner. The front and rear cross members 12, 14 are manufactured and/or formed from a relatively light and durable material, which in the preferred embodiment is aluminum. In one non-limiting embodiment, the front and rear cross members 12, 14 are stamped using commercially available 5.0 mm, NG5754-0 aluminum material. Front cross member 12 includes a lower flange 30 which is formed along the bottom of member 12 and orthogonally projects from the vertical portion 32 of member 12.

Reinforcement plates 16, 18 have lengths 38, 40 which are respectively shorter than lengths 34, 36 of cross members 12, 14. In one non-limiting embodiment, lengths 38, 40 are respectively approximately one third of lengths 34, 36. Plates 16, 18 are disposed in the center of cross members 12, 14 when towing apparatus 10 is assembled. Plates 16, 18 are formed from a relatively heavy, load-bearing material, and in the preferred embodiment are made from heavy-gauge galvanized steel. In one non-limiting embodiment, plates 16, 18 are formed from 2.0 mm steel sheet and are treated with a conventional corrosion preventative coating. Plate 16 is shaped to conform to the center portion of member 14 and is coupled to the center portion of member 14 in a conventional manner; and plate 18 is shaped to conform to the center portion of member 12 and is coupled to the center portion of member 12 in a conventional manner. In one non-limiting embodiment, plates 16, 18 are respectively coupled to members 14, 12 by use of self-piercing rivets. Plate 18 includes a lower flange 31 which is formed along the bottom of plate 18 and orthogonally projects from the vertical portion 33 of plate 18. When plate 18 is coupled to member 12, flange 31 is disposed beneath flange 30 and abuts flange 30.

Assembly 10 further includes a receiver tube 24 which is disposed in the center of assembly 10. Receiver tube 24 has a generally square cross-section and extends through apertures 42, 44, 46 and 48 which are respectively formed in the center of cross member 14, plate 16, cross member 12 and plate 18. Tube 24 is formed from a high strength material, and in the preferred embodiment is made from high-strength steel and is welded to plates 16 and 18 in a conventional manner. Tube 24 is adapted to accept and retain a conventional trailer ball or "hitch" (not shown). In the preferred embodiment, tube 24 includes apertures 50 which are adapted to receive a conventional dowel or pin member, effective to secure a hitch to tube 24. A conventional cap 60 is provided which selectively and frictionally engages the end of receiver tube 24, thereby substantially preventing water or other elements from entering receiver tube 24 when a hitch is not being used.

Assembly 10 further includes a generally cylindrical sleeve or tube 20 which is disposed in relative close proximity to the tube 24 (i.e., to the left of the receiver tube 24) and which allows for the passage of electrical wires/conduits through assembly 10, thereby allowing a towed trailer to be communicatively and electrically coupled to vehicle components or electronics. Sleeve 20 extends through generally circular apertures 52, 54, 56 and 58 which are respectively formed in cross member 14, plate 16, cross member 12 and plate 18. In the preferred embodiment, sleeve 20 is formed from a lightweight material, and in one non-limiting embodiment comprises an aluminum extrusion. Sleeve 20 is coupled to cross members 12, 14 and/or plates 16, 18 in a conventional manner.

Towing hooks 22 are manufactured from a relatively strong material, such as heavy-gauge steel, and are attached to the bottom of assembly 10 in a conventional manner. In the preferred embodiment, towing hooks 22 are welded to the bottom steel flange portion 31 of plate 18, by use of a conventional welding process.

In the preferred embodiment, bracket assemblies 26, 28 are made from a lightweight, durable material, such as aluminum. Bracket assemblies 26, 28 respectively include upper mounting brackets 62, 64, inner mounting brackets 66, 68 and outer mounting brackets 70, 72. Inner and outer mounting brackets 66, 68 and 70, 72 are generally rectangular and are "flared" in opposite directions so as to better distribute the stresses resulting from loads applied to the towing cross member 10. Inner brackets 66, 68 include "inwardly" projecting upper flange portions 74, 76, which allow for increased surface area for attachment to brackets 62, 64, respectively, and side flange portions 78, 80 which allow for increased surface area for attachment to member 12. Outer brackets 70, 72 include "outwardly" projecting upper flange portions 82, 84, which allow for increased surface area for attachment to brackets 62, 64, respectively, and side flange portions 86, 88 which allow for increased surface area for attachment to member 12. Inner and outer mounting brackets 66, 68 and 70, 72 are fixedly attached to member 12 in a conventional manner (e.g., welded). Upper brackets 62, 64 are fixedly attached to member 14 in a conventional manner (e.g., flange portions 78, 80 and 86, 88 are welded to member 12). Upper brackets 62, 64 are fixedly attached to member 14 in a conventional manner (e.g., welded) and include upper flange portions 90, 92 which are respectively coupled to brackets 66, 70 and 68, 72 in a conventional manner (e.g., welded). Inner and outer mounting brackets 66, 68 and 70, 72 each include three substantially identical apertures 94 which are adapted to receive conventional bolt-type fasteners, thereby allowing the assembly 10 to be mounted to the vehicle frame (e.g., to the rear frame rails) or other portion of a vehicle.

Referring now to FIGS. 3A–3E, there is shown, one non-limiting example of an assembly procedure which is used to construct lightweight towing cross member 10. In the first step, shown in FIG. 3A, the trailer hitch receiver tube 24 is attached to the reinforcement plate 16 in a conventional manner (e.g., "MIG welded"). In the second step, shown in FIG. 3B, the reinforcement plate 16 is fixedly attached to rear cross member 14 by use of self-piercing rivets. In the third step, shown in FIG. 3C, upper mounting brackets 62, 64 are fixedly attached to the outer surface of cross member 14 in a conventional manner. Also, in this step, inner brackets 66, 68 are respectively and fixedly attached to outer brackets 70, 72 in a conventional manner. In the fourth step, shown in FIG. 3D, reinforcement plate 18 is fixedly attached to front cross member 12 by use of self-piercing rivets. Also, in this step, brackets 66, 70 and 72, 68 are attached to cross member 12 in a conventional manner (e.g., welded). In the fifth step, shown in FIG. 3E, front cross member 14 is attached to rear cross member 12 in a conventional manner and tube 20 is inserted and attached to members 12, 14, thereby forming assembly 10. To further secure and/or enhance the structural integrity of assembly 10, receiver tube 24 may be welded to reinforcement plate 18, and upper brackets 62, 64 (i.e., flange portions 90, 92) are respectively coupled to brackets 66, 70 and 68, 72 in a conventional manner (e.g., welded).

Assembly 10 may be installed onto a vehicle body or frame in a relatively quick and simple manner, such as by bolting the assembly to the frame rails of a vehicle (e.g., through apertures 94). In operation, forces and/or loads which are translated to and/or imparted upon the towing hitch are transferred from the receiver tube 24 to the heavy gauge load-bearing plates 16, 18, which absorb much of the loads and distribute them over the center portion of the towing cross member assembly 10. In this manner, plates 16, 18 assist in absorbing these forces and/or loads, and provide additional rigidity and strength to the center portion of the assembly 10. The loads are then transferred to the frame of the vehicle through members 12, 14 and bracket assemblies 26, 28. Members 12, 14, plates 16, 18 and brackets 26, 28 collectively transfer and diffuse towing loads and/or forces to other portions of the vehicle frame or body which can efficiently absorb these loads.

Assembly 10 offers a significant advantage over prior art support assemblies due to its lightweight design. Particularly, the use of relatively heavy load bearing materials (e.g., heavy-gauge steel) in only a few critical areas, greatly reduces the overall weight of the towing assembly 10, thereby improving fuel economy and making the assembly process easier. This decreased weight may also reduce building cycle time and labor costs. The heavy-gauge, load bearing material or steel (i.e., plates 16, 18) is localized in the areas of high stress (i.e., the center of the assembly 10), and provides the assembly with load-bearing ability and towing performance which are substantially identical to those of prior towing cross member assemblies, which are manufactured solely from heavy-gauge steel. In alternate embodiments, the shape and size of plates 16, 18 may be modified and/or optimized based upon the shape and/or configuration of member 10 and the areas of member 10 which experience the highest amounts of stress during towing operation.

It should be understood that this invention is not to be limited to the exact construction or embodiment described above but that various changes may be made without departing from the spirit or scope of the invention.

What is claimed is:

1. A towing cross member for use with a vehicle, said towing cross member comprising:
   a first cross member;
   a first reinforcement plate which conforms with and is coupled to a center portion of said first cross member;
   a second cross member which is coupled to said first cross member;
   a second reinforcement plate which conforms with and is coupled to a center portion of said second cross member;
   a receiver tube which is fixedly disposed within the center of said towing cross member and which is adapted to receive a trailer hitch; and
   a pair of bracket assemblies which are coupled to said first and second cross members and which are adapted to allow said towing cross member to be mounted to a portion of said vehicle.

2. The towing cross member of claim 1 wherein said first and second cross members are made from an aluminum material.

3. The towing cross member of claim 2 wherein said reinforcement plates are made from a heavy-gauge steel material.

4. The towing cross member of claim 3 wherein said receiver tube is made from a heavy-gauge steel material.

5. The towing cross member of claim 4 wherein said receiver tube is welded to said first and said second reinforcement plate.

6. The towing cross member of claim 3 wherein said first and second reinforcement plates are respectively attached to said first and second cross members by use of self-piercing rivets.

7. The towing cross member of claim 1 further comprising a hollow tube which passes through said first and second cross members and said first and second reinforcement plates.

8. The towing cross member of claim 1 wherein each bracket assembly includes flared inner and outer bracket members which are fixedly attached to said first cross member; and an upper bracket member which is fixedly attached to said second cross member and to said flared inner and outer bracket members.

9. The towing cross member of claim 1 wherein said first and second reinforcement plates are shaped to conform with areas of said cross member which experience relatively high stress during towing operation.

10. A towing cross member for use with a vehicle, said towing cross member comprising:
    a first generally elongated cross member which is formed from a relatively lightweight material;
    a first steel reinforcement plate which conforms with and is coupled to a center portion of said first generally elongated cross member;
    a second generally elongated cross member which is formed from said relatively lightweight material and which is coupled to said first generally elongated cross member;
    a second steel reinforcement plate which conforms with and is coupled to a center portion of said second generally elongated cross member;
    a steel receiver tube which is fixedly disposed within the center of said towing cross member and which is adapted to receive a trailer hitch; and
    a pair of bracket assemblies which are coupled to said first and second generally elongated cross members and which are adapted to allow said towing cross member to be mounted to a portion of said vehicle.

11. The towing cross member of claim 10 wherein said relatively lightweight material comprises aluminum.

12. The towing cross member of claim 10 wherein each of said pair of bracket assemblies includes a pair of generally rectangular members which are flared in opposing directions and which are coupled to said first generally elongated cross member, and an upper bracket member which is coupled to said second generally elongated cross member and to said pair of generally rectangular members.

13. The towing cross member of claim 12 wherein said first steel reinforcement plate includes a flange portion which forms a bottom surface of said member, and further comprising at least one hook which is welded to said bottom surface of said first steel reinforcement plate.

14. The towing cross member of claim 10 wherein said first and second generally elongated cross members are of a first length and wherein said first and second steel reinforcement plates are of a second length which is approximately one third of said first length.

* * * * *